(12) United States Patent
Green et al.

(10) Patent No.: US 7,864,960 B2
(45) Date of Patent: Jan. 4, 2011

(54) TECHNIQUES FOR SECURING CONTENT IN AN UNTRUSTED ENVIRONMENT

(75) Inventors: Tammy Anita Green, Provo, UT (US); Jim Alan Nicolet, Elk Ridge, UT (US); Haripriya Srinivasaraghavan, Bangalore, IN (US)

(73) Assignee: Novell, Inc., Provo, UT (US)

( * ) Notice: Subject to any disclaimer, the term of this patent is extended or adjusted under 35 U.S.C. 154(b) by 885 days.

(21) Appl. No.: 11/755,837

(22) Filed: May 31, 2007

(65) Prior Publication Data

US 2008/0301470 A1 Dec. 4, 2008

(51) Int. Cl.
- H04L 9/00 (2006.01)
- H04L 9/08 (2006.01)
- G06F 11/30 (2006.01)
- G06F 12/14 (2006.01)

(52) U.S. Cl. .................. 380/277; 380/278; 380/279; 380/282; 380/285; 380/286; 713/193

(58) Field of Classification Search ......... 380/277–286; 713/193
See application file for complete search history.

(56) References Cited

U.S. PATENT DOCUMENTS

| | | | |
|---|---|---|---|
| 5,682,523 A | 10/1997 | Chen et al. | |
| 6,158,007 A | 12/2000 | Moreh et al. | |
| 6,557,122 B1 | 4/2003 | Sugauchi et al. | |
| 2001/0010723 A1* | 8/2001 | Pinkas | 380/286 |
| 2002/0157017 A1 | 10/2002 | Mi et al. | |
| 2003/0012387 A1* | 1/2003 | Gilbert et al. | 380/286 |
| 2004/0250133 A1 | 12/2004 | Lim et al. | |
| 2005/0097516 A1 | 5/2005 | Donnelly et al. | |
| 2005/0190921 A1* | 9/2005 | Schlafer et al. | 380/278 |
| 2006/0001537 A1 | 1/2006 | Blake et al. | |
| 2006/0023876 A1 | 2/2006 | Ksontini et al. | |
| 2006/0242415 A1* | 10/2006 | Gaylor | 713/176 |

* cited by examiner

*Primary Examiner*—Michael J Simitoski
*Assistant Examiner*—Jahangir Kabir
(74) *Attorney, Agent, or Firm*—Schwegman, Lundberg & Woessner, P.A.

(57) ABSTRACT

Techniques for securing content in an untrusted environment are provided. Content is encrypted and stored with a content delivery service in an encrypted format. Encrypted versions of a content encryption/decryption key and a first key are also housed and distributed by the content delivery service. The first key is used to decrypt the encrypted version of the content encryption/decryption key. The content delivery service is unaware of the content encryption/decryption key and the first key; and the content held by the content delivery service is encrypted with the content encryption/decryption key. Principals securely share, create, manage, and retrieve the encrypted versions of the content encryption/decryption key and the first key from the content delivery service using secure communications. The encrypted content is obtainable via insecure communications from the content delivery service.

10 Claims, 3 Drawing Sheets

TECHNIQUES FOR SECURING CONTENT IN AN UNTRUSTED ENVIRONMENT

FIELD

The invention relates generally to security and more particularly to techniques for securing content in an untrusted environment.

BACKGROUND

Increasingly, enterprises and individuals are housing data that may be confidential in nature in remote environments across the Internet. This information can be transmitted over the Internet using secure and insecure communication mechanisms.

Often to assure confidentiality, the data storage service permits the information to be encrypted and/or retrieved via secure communications, such as Secure Sockets Layer (SSL), etc.

However, there have been instances where the data storage service is penetrated by an intruder and confidential data is compromised. Some of these instances have received worldwide attention in the news. The problem is not limited to private enterprises; the federal government has also encountered security issues with confidential data being compromised.

Additionally, even if outside intruders are not capable of penetrating a confidential data repository, there is still a substantial risk that individuals internal to an enterprise or the government may surreptitiously compromise confidential data. In fact, this situation poses an even greater risk because even if the data is encrypted within the repository the encryption/decryption keys are retrievable or discoverable by the internal administrators associated with the data repository. As a result, there are still substantial security risks with outsourcing confidential data, and so much so that many enterprises and individuals still refuse to outsource their sensitive data. But, internally managing sensitive data requires staff, systems, policies, and resources, which can add to the bottom line of enterprises; and many of these enterprises, are not adept at performing these technical tasks.

Consequently, there is a need for improved techniques to secure and manage content.

SUMMARY

In various embodiments, techniques for securing content in an untrusted environment are provided. In an embodiment, an encrypted version of a content encryption/decryption key is received from a principal. The content encryption/decryption key has been previously encrypted by the principal using a first key known to just the principal. An encrypted version of the first key is also received from the principal. The encrypted versions of the content encryption/decryption key and the first key are stored in an environment that is remote from the principal over a network connection. Encrypted content is also housed; the encrypted content is supplied by the principal and has already been encrypted by the principal with the content encryption/decryption key. The encrypted content is delivered via insecure communications and the encrypted versions of the content encryption/decryption key are delivered, in response to policy, via secure communications.

DETAILED DESCRIPTION

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output. Additionally, a "principal" is a type of resource that actively interacts with other resources. So, a principal may be a user or an automated service.

A "client" is an environment having one or more machines that is enabled over a network and that includes resources and in some cases processes the resources. A "server" is also an environment having one or more machines that is enabled over a network and that includes resources and in some cases processes the resources. The terms "client" and "server" when used in combination define a client-server architecture, where the client and server are remote from one another over a network connection, such as a wide-area network (WAN) and insecure public communications network such as the Internet. Both a client and a server may be viewed as types of resources similar to what was described above with reference to the principal. In some cases, the client-server architecture may be embodied and represented on a same physical machine, this occurs when multiple virtual machines are processing on the same physical architecture, such that one virtual machine is the client and another virtual machine is the server.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) may collectively be viewed as a processing environment. The processing environment also refers to software configurations of the physical processing devices, such as but not limited to operating system, file system, directory service, etc.

As used herein the term "key" is used for purposes of encrypting and decrypting content. "Content" includes any logically related set of electronic information, such as related documents, videos, graphics, spreadsheets, text, audio, images, executable scripts, etc. The key may be produced using any known technique for purposes of achieving encryption and decryption. Moreover, the size and type of key is configurable. For example, in some cases the keys may be 448 bit Blowfish keys. Similarly, the encryption and decryption techniques can be any known technique, such as but not limited to Password Based Encryption (PBE) algorithms, etc.

A resource (such as a principal) is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
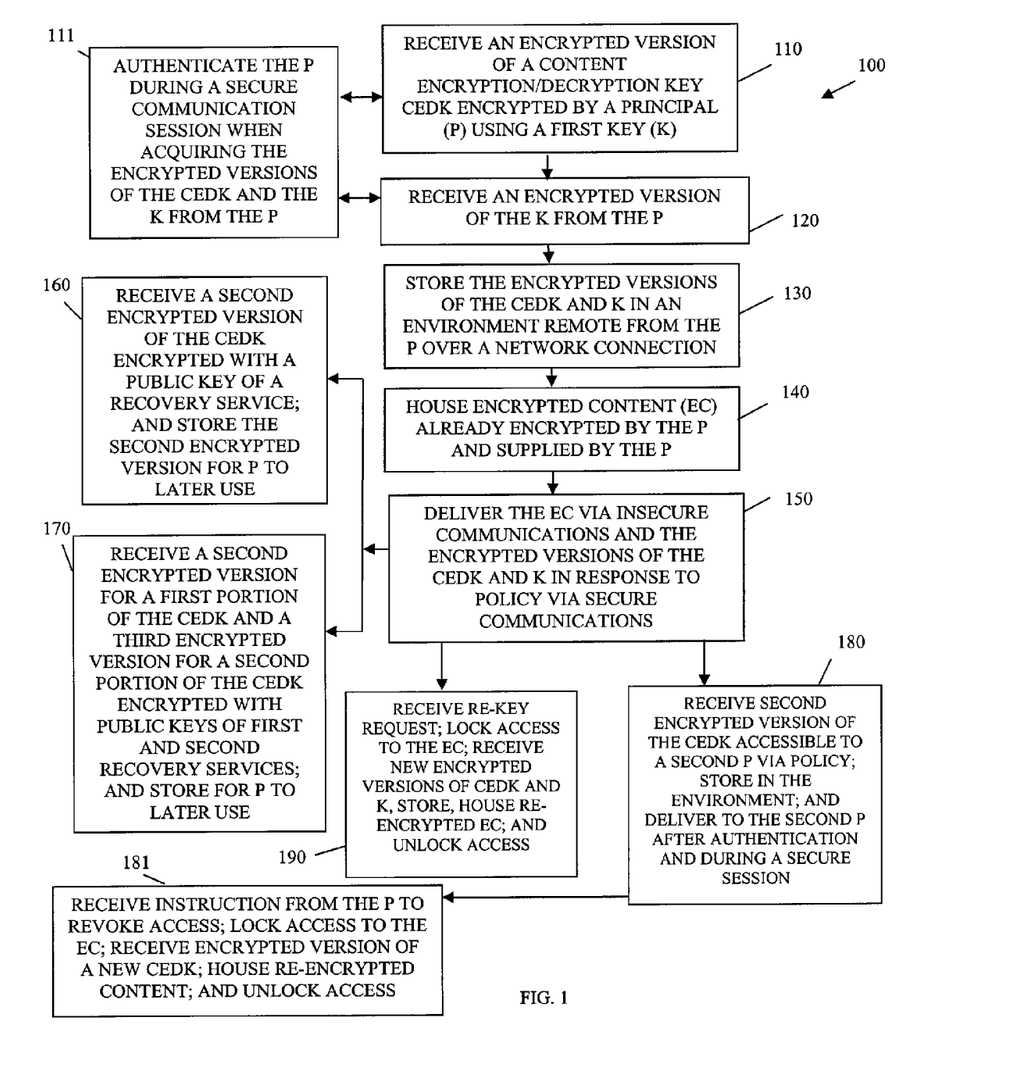
FIG. 1 is a diagram of a method for a secure content delivery and management, according to an example embodiment.

FIG. 1 is a diagram of a method 100 for a secure content delivery and management, according to an example embodiment. The method 100 (hereinafter "content service") is implemented as instructions in a machine-accessible and readable medium. The instructions when executed by a machine perform the processing depicted in FIG. 1. The content service is also operational over and processes within a network. The network may be wired, wireless, or a combination of wired and wireless.

In an embodiment, the content service represents a server service that clients use over a network connection, such as the Internet, to store and retrieve and manage confidential or sensitive content. The content service can communicate with principals associated with the clients over secure communication channels, such as SSL, HTTPS, a Virtual Private Network (VPN), etc. Additionally, the content service can communicate with principals associated with the clients over insecure communication channels, such as HTTP, etc. Some communications as described below will use the secure communication channels in accordance with mandatory policy while other communications can use insecure communication channels.

At 110, the content service interacts directly or indirectly with a principal in a client environment via a client service (described below with reference to the method 200 of the FIG. 2. The content service receives from the principal an encrypted version of a content encryption/decryption key (CEDK).

The actual CEDK is not known and is not discoverable by the content service; rather the content service just receives an encrypted version of the CEDK. The CEDK is used by the principal and by other principals authorized by the principal to encrypt and decrypt content. But again, the actual CEDK is hidden from the environment of the content service and is not known or discoverable by the CEDK. So, the content service or any administrators having internal access to the CEDK cannot compromise the content of the principal, since as will be demonstrated below, the content is supplied to the content service in encrypted format as well. Such an arrangement combined with additional security features described below provides assurances to the principal that the content cannot be internally compromised by the content service, by someone gaining unauthorized access to the content service, or by malicious internal administrators of the content service.

The CEDK is encrypted with a first key by the principal that supplies the encrypted version of the CEDK.

At 111, the content service and the principal (via a client service) initially engage in an authentication and secure communication session before the encrypted version of the CEDK is even delivered from the principal to the content service. This may be achieved via SSL. The client service may require that the content service authenticate to it and that a proper and valid server certificate be validated for the content service (or some part of a certificate chain). Once the client service authenticates the content service, the principal sends credentials, such as identifier and password to mutually authenticate to the content service. In some cases and depending on the configuration of the sever of the content service, the content service does an Lightweight Directory Access Protocol (LDAP) bind to authenticate the principal, or uses a local store of principal names and passwords to authenticate the principal (e.g., user or automated service). Once authenticated, the principal just has access to those repositories or assets of the content service that access policy for the principal permits.

Once the principal is inside or has access to the content service, the principal can encrypt and/or decrypt available content. The principal can store, search, and retrieve content and share and manage access rights to content owned by the principal. Additionally, a variety of encryption key management and escrow features are provided, as described more completely herein and below.

At 120, the content service also receives from the principal an encrypted version of the first key. Again, the first key (K) was privately used by the principal on the client side to encrypt the CEDK. Moreover, the encrypted versions of both the CEDK and the K are received at 111 via a secure communication session, where the content service has authenticated with the client service of the principal and the principal has authenticated to the content service, and a secure communication channel may be used, such as SSL.

At 130, the content service stores the encrypted versions of the CEDK and K on behalf of the principal within an environment of the content service. The environment is remote over a network connection from the client service of the principal. In some cases, the network connection is a wide-area network (WAN), such as the Internet. These encrypted keys are later delivered to the principal or in some cases to other authorized principals when properly requested and when authorized to do so by policy.

At 140, the content service also houses encrypted content (EC) within the environment of the content service. The original content associated with the EC has already been encrypted when it is received by the content service. This encryption was performed by the principal using the CEDK and the CEDK is also not known to the content service, since it was just supplied in encrypted format and was encrypted with the K. Furthermore, the K is not known to the content service, since it was supplied in an encrypted format as well. More particulars on the encryption performed at the client service are discussed in detail below with reference to the FIG. 2.

At this point in time, the principal has successfully authenticated with the content service, successfully requested that a new file or new content be established and successfully stored or housed within the environment of the client service the encrypted versions of the CEDK and K and the EC. Access rights to these items may also be defined by the principal and policy. This subsequently drives when and how and if the content service subsequently delivers any of this information to the original principal or to other principals authorized by the principal.

Accordingly and at some later point in time, at 150, the content service delivers the EC via insecure communications to recipients in response to policy and may also deliver the encrypted versions of the CEDK and K in response to policy via secure communications. That is, the EC can be delivered via insecure mechanisms since it is encrypted. However, delivery of the encrypted key information (CEDK and K) is delivered by secure communication sessions to recipients that are mutually authenticated and trusted.

In an embodiment, at 160, the original principal may decide that its access to the K (used to decrypt the encrypted version of the CEDK) may be lost or forgotten, and as such the principal desires to escrow the CEDK with a trusted third-party recovery service or agent. In support of this, the principal may supply a second encrypted version of the CEDK to the content service for the content service to manage and distribute, such that the principal can recover it via the recovery service when needed by the principal. In this situation, the principal may supply the second encrypted version of the CEDK by encrypting it with a public key of the recovery service. The recovery service has no access to the content service. In this way, should the principal lose or forget the paraphrase or decryption technique to recover the CEDK from the first encrypted version of the CEDK (already supplied to the content service at 120) then the principal can request the escrowed encrypted second version of the CEDK from the content service and then supply it to the recovery service and have the recovery service decrypt it and then supply it back to the principal for use. Thus, the content service is also capable of performing third-party key escrow.

In some cases, at 170, the principal may desire a stronger key escrow technique such that no one recovery service has access to the entire CEDK. That is, multiple recovery services (two or more) may each be capable of retrieving a piece of the CEDK for the principal when the principal forgets it or loses it or is otherwise unable to re-acquire the CEDK independently. So, the principal sends and the content service receives second and third encrypted versions of the CEDK. Each encrypted version is for a different portion of the CEDK and not a complete portion, such that when portions are combined a complete CEDK is assembled. Each encrypted version is encrypted by the principal using a different recovery service's public key. So, when the principal needs to recover the CEDK, the principal requests each of the versions from the content service (as the recovery services have no access rights to the content service) and then supplies the appropriate versions to the respective recovery services for decryption. Each recovery service returns its decrypted version of the CEDK. The principal then assembles the CEDK and uses it to decrypt the EC.

It may also be that the principal wants to share the encrypted content with a second principal or selective groupings of principals. In such a case, at 180, the content service receives from the original principal a second encrypted version of the CEDK and access rights or policy that lets the content service know the second principal is authorized to receive the second encrypted version. The second encrypted version of the CEDK is encrypted via a phrase or key created by the original principal and communicated from the original principal to the second principal via some mechanism, such as email, phone, etc. The content service stores the second encrypted version of the CEDK within the environment of the content service. Subsequently, the second principal requests the second encrypted version of the CEDK during a secure communication session in which the second principal is authenticated and the content service delivers the second encrypted version of the CEDK to the second principal for use in decrypting the EC and/or adding addition EC. Note that when the second principal logs in or acquires access for the first time that the second principal may or may not be required to generate a new encrypted version of the CEDK using a new K known to just the second principal and also supply an encrypted version of the new K.

At 181, just as the principal grants access rights to the EC the principal may revoke access rights to the EC from the second principal. Correspondingly, the content service receives a revocation of access rights instruction from the original principal. Next, access to the EC is locked for all participants (note that for illustrative purposes a single second principal was used to show the EC was shared but in practice the participants may be an entire group having three or more participants). Lock down occurs to prevent the EC from being accessed while the content service revokes the access rights of the second principal. The content service then receives and stores an encrypted version of a second and new CEDK from the original principal. This encrypted version may be encrypted with the K, since this was never disclosed or available to the second principal and is communicated via a secure communication session. The principal then re-encrypts the content using the second CEDK and supplies it to the content service to house in the environment of the content service and the content service unlocks the access restrictions to the re-encrypted content. The second principal can no longer decrypt the content and cannot decrypt the encrypted second CEDK to acquire the second CEDK.

It may also be the case, at 190 that the principal wants to re-key everything housed and being managed by the content service. Thus, the content service receives such an instruction from the principal. Access is locked to the EC and the encrypted keys. The principal supplies new encrypted versions of the CEDK (a new CEDK is also generated by the principal) and the K (a new K is also generated by the principal) and the EC are re-encrypted with the new CEDK. The content services stores all this encrypted information and then unlocks access.

To illustrate the operations described above an example is now presented where the names or users are to be considered principals. Again, this is but one scenario and other scenarios may be achieved with the teachings presented herein.

Alice logs into and mutually authenticates with the content service, this may occur via SSL and using LDAP binding techniques as discussed above. From the client device, Alice indicates she wants to create a file or repository (content) for the content service to manage. The content service verifies that Alice has permission to do this via policy and ask for any recovery services or agents that Alice may want to use (discussed above). Recovery services may be mandatory for Alice and may be pre-identified; alternatively recovery services may be optional and/or supplied and identified on demand by Alice.

The recovery services is a resource that has no access to the content service, it is trusted not to disclose their private key to the content service or an administrator or other users/principals and the recovery services has its own public certificate (public key) and privately held key. Alice may optionally elect one or more recovery services or may via policy be required to accept one or more recovery services. Again, if multiple recovery services are used fault tolerance may be achieved should one recovery service be unavailable when needed and/or security is ensured if no single recovery service possesses the entire encrypted version of the CEDK. Note that another scenario not directly discussed above is for multiple redundant recovery services to possess an entire encrypted version of the CEDK.

Next, the client service for Alice creates a data or content encryption/decryption key (CEDK) and a key encryption key (K), both may be 448 bit Blowfish keys. Alice also inputs a paraphrase and K is further encrypted with that paraphrase using Password Based Encryption (PBE) algorithms to produce E-K. The CEDK is encrypted with K to produce E-CEDK. Thus, E-K=PBE (paraphrase supplied by Alice, (key type+key size+k)) and E-CEDK=Blowfish (K, (key type+key size+CEDK)).

If recovery has been selected, the client service encrypts the CEDK using the certificate for each recovery service selected. Each encryption may be different depending on the recovery service being used. For example, for fault tolerance where each recovery service has the entire encrypted version of the CEDK there may be E2-CEDK=CEDK encrypted with pubic key of recovery service 1; and E3-CEDK=CEDK encrypted with public key of recovery service 2, etc. For additional security where no one recovery service holds the entire encrypted CEDK with 3 recovery services being used: E2-CEDK=part 1 and part 2 of CEDK encrypted with the public key of recovery service 1; E3-CEDK=part 1 and part 3 of CEDK encrypted with public key of recovery service 2; and E4-CEDK=part 2 and part 3 of CEDK encrypted with public key of recovery service 3.

Alice's client service sends E-CEDK and E-K to the content service along with any used recovery service encrypted keys for the CEDK (escrowed keys). Alice then uses the client service to encrypt content (EC) with the CEDK and transmits the EC to the content service for storage as well.

Subsequently, when Alice logs back into the content service a second time E-CEDK and E-K are returned to Alice for use over an SSL connection. Once this is done, the session with Alice may revert back to normal insecure communications, such as Hypertext Transfer Protocol (HTTP communications). If Alice, on the client side, properly enters her paraphrase for E-K, then K is returned to her. She can then use K to decrypt E-CEDK and acquire CEDK. Using CEDK Alice can decrypt the EC retrieved from the content service over insecure communication channels if desired and can encrypt additional content using the CEDK and store it back with the content service.

Alice may also want to share the EC with someone, such as Bob. To do this, Alice (again on the client side) indicates to the content service via secure communications that she wants to share the EC with Bob. The client service creates a random one-time paraphrase (OTP) for Alice. Alice sends this OTP as an invitation to Bob using some out-of-band communication mechanism (e.g., email, call on phone, etc.). The client service then encrypts the CEDK using the OTP to produce E2-CEDK. Alice sends E2-CEDK to the content service along with information about what rights Bob should have within the content service with respect to the EC. The content service stores this information associated with Bob.

When Bob logs into the content service he is notified about the pending invitation from Alice or maybe he already knows because Alice contacted him (email, phone, in person, etc.). Bob accepts the invitation and provides the OTP that he got from Alice on his client; this is validated and used to decrypt E2-CEDK. Bob, on the client, may be then prompted to change the OTP to produce his own independent E3-CEDK because by policy E2-CEDK may expire or become unusable as distributed by the content service after so many uses (perhaps just one usage) or after a certain amount of time. E3-CEDK is then sent back to the content service for storage.

Later, Alice may want to revoke Bob's access rights. Alice authenticates in a secure session with the content service and indicates she wants Bob's access rights to the EC revoked. The content service locks all access to the EC. Alice re-encrypts the content E2-C using CEDK-2 and encrypts CEDK-2 with K to produce E-CEDK2; E-CEDK2 and E2-C are provided back to the content service, E-CEDK and EC is removed from the environment of the content service and replaced with E2-C and E-CEDK2. Access is unlocked. Now Bob cannot gain access to the content. If other users that were using the EC are still authorized then the new E-CEDK2 is supplied to them upon login such that they can continue to use the new E2-C. It should also be noted that revocation can be done by any resource having the proper access rights; so, revocation is not limited to the owner of the content.

It may also be the case that the content is not re-encrypted after Bob's access rights are revoked, since Bob may have already viewed all the content in question. In this case, a new key is used to encrypt just new or subsequent content, since it is may only be important to keep Bob from viewing new content from the point in time that Bob's access rights are revoked. The new key is also used to re-encrypt any existing content that is modified after Bob's access rights were revoked. Such a technique may be referred to as "lazy encryption."

Alice may also want to periodically re-key everything. To do this, the secure request is sent to the content service. The content service locks access to the encrypted keys and the EC. Alice re-keys and supplies the re-encrypted keys and content to the content service to replace the prior information and access is unlocked. Any shared users receive an invitation similar to what was discussed above to share in access with the new EC.

Figure 2:
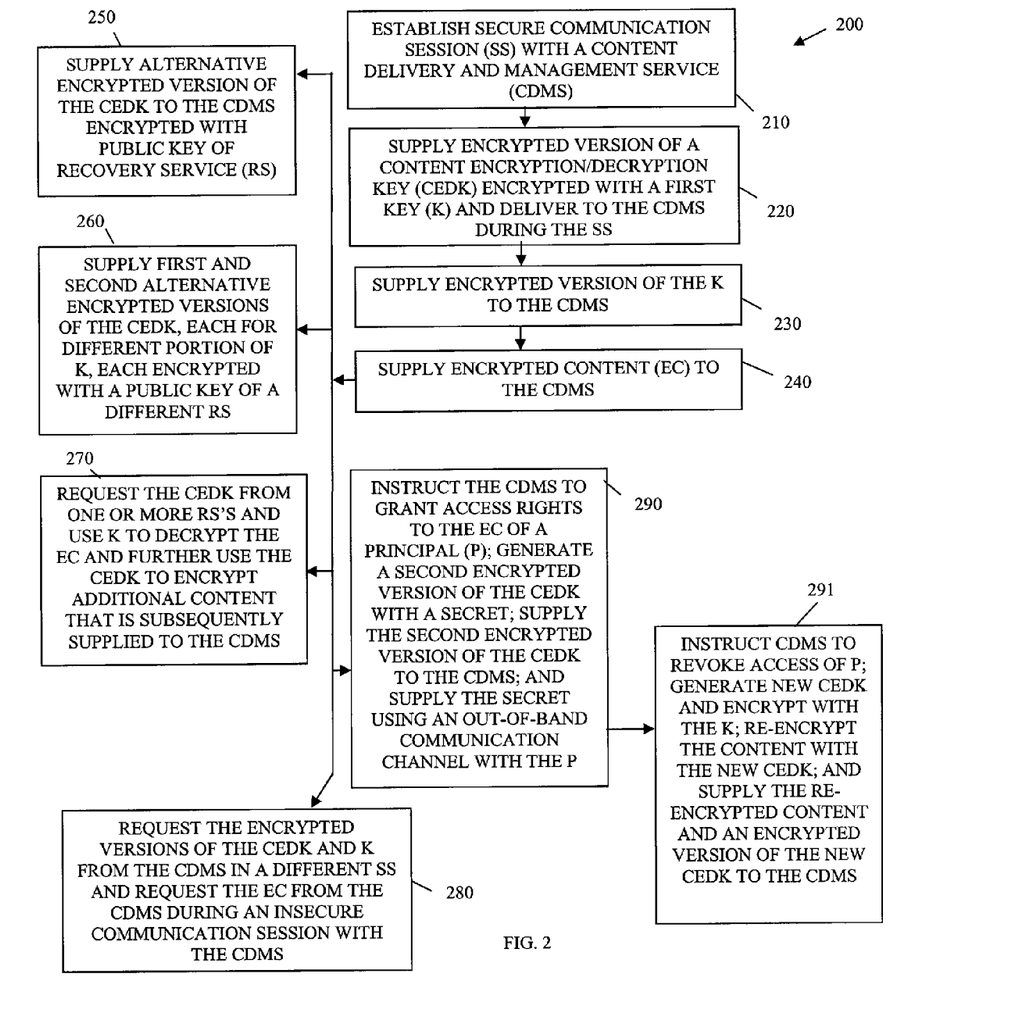
FIG. 2 is a diagram of another method for a secure content delivery and management, according to an example embodiment.

FIG. 2 is a diagram of another method 200 for a secure content delivery and management, according to an example embodiment. The method 200 (hereinafter "client service" is implemented in a machine-accessible and readable medium as instructions. The instructions when executed by a machine perform the processing depicted in the FIG. 2. Moreover, the client service is operational over a network, and the network may be wired, wireless, or a combination of wired and wireless.

The client service communicates with the content service represented by the method 100 of the FIG. 1 to manage, retrieve, share, sensitive content. The operations of the content service were discussed above in detail with reference to the FIG. 1.

At 210, the client service on behalf of a principal establishes a secure communication session, such as via SSL, with a content delivery and management service (referenced above as the content service represented by the method 100 of the FIG. 1). Once the mutually authenticated secure session is established, the client service may supply encrypted key information as described below to the content delivery and management service for the content delivery and management service to distribute, deliver, and manage on behalf of the owning principal and other principals that the owning principal shares secure content with.

At 220, the client service supplies an encrypted version of a content encryption/decryption key (CEDK). The CEDK is generated by the client service and is encrypted with a first key (K) known to just the principal and produced by the principal via the client service. The encrypted version of the CEDK (E-CEDK) is supplied over the secure communication session to the content delivery and management service.

Similarly, at 230, the client service supplies an encrypted version of the K (E-K) to the content delivery and management service over and during the secure communication session with the content delivery and management service.

At this point, the client service has established its intentions with the content delivery and management service and set up the policy and encrypted keys as described above for content or a set of content owned by a principal. The client service then encrypts content with the CEDK. The client may have acquired the CEDK at some point after the initial setup or may have logged in to the content delivery and management service during a separate session and interaction and acquired the E-K and E-CEDK. If the latter situation is the case, then the client service uses a private paraphrase known to the principal or some other private key to decrypt the E-K and acquire K, with K E-CEDK is decrypted to acquire CEDK.

At 240, the client service supplies EC to the content delivery and management service (CDMS). Now the principal via the client service is equipped to securely acquire content from the CDMS and without the fear that the CDMS may be compromised or that an insider may compromise the content within the CDMS, since at no point in time did the CDMS gain possession of the CEDK and the content is encrypted with the CEDK. At this point, the principal via the client service may elect to share the content, escrow encrypted keys, and perform other useful features via the CDMS.

For example, at 250, the client service may supply alternative encrypted version of the CEDK (E2-CEDK) to the CDMS. E2-CEDK is encrypted with the public key or certificate of a trusted-third party recovery service and stored in the CDMS by the client service. Should the principal forget how to decrypt the E-K to acquire the K and decrypt the E-CEDK for purposes of getting the CEDK, then the principal may still acquire the E2-CEDK from the CDMS and supply it to the recovery service. The recovery service uses its private key to decrypt E2-CEDK and supplies the CEDK to the principal. The recovery service for security purposes may not be capable of accessing the CDMS or even interacting with other principals. Note further that the principal via the client service may for redundancy and fault tolerance and fail over purposes store multiple encrypted versions of the CEDK for multiple redundant recovery services with the CDMS (as described in the example scenario presented above with respect to the FIG. 1). The number of recovery services is not limited to one or any particular number; in fact, the number of recover services can be configured to be N, where N is any desired number of recover services. A recover service may prove useful for a variety of reasons, such as when a particular service goes out of business and is no longer available to supply the keys, when a failure occurs with a particular recovery service such that it is not available, etc.

In another case, at 260, the client service may not want to supply any particular recovery service with an entire encrypted version of the CEDK. Consequently, the client service on behalf of the principal may elect to encrypt different portions of the CEDK (some may be redundant with other recover services as discussed in the example scenario of the FIG. 1) with the public key or certificate of different recovery services and store each different encrypted version of the CEDK with the CDMS. Again, if the principal forgets or loses the ability to decrypt the E-K, then the principal can acquire the different encrypted versions of the CEDK from the CDMS and provide those to each of the appropriate recovery services and then the client service can assemble a complete version of the CEDK for the principal to use. Again, it is also noted that more than 2 or even 3 recovery services may be used and the exact number can be configured to any desired integer number, N.

The processing at 250 and at 260 describes key escrow mechanisms. At 270, the principal via the client service may recover those keys by requesting assistance of the one or more recovery services used. To do this, the client service acquires the encrypted versions of the CEDK from the CDMS and then supplies then to the appropriate recovery services for decryption. The recovery services return either a complete CEDK or portions of a CEDK. The client service assembles a complete CEDK and uses this to decrypt the encrypted content or to further encrypt additional content that is subsequently supplied to the CDMS in the encrypted format.

As was discussed above with respect to the processing at 240, the principal may regularly return during different communication sessions to the CDMS to retrieve the encrypted content (EC) and the encrypted keys (E-K and E-CEDK) and even escrow keys (as discussed above). Thus, at 280, the client service may subsequently request the E-K and E-CEDK from the CDMS during a different secure communication session and then request the EC during an insecure communication session from the CDMS.

At 290, the client service may subsequently also instruct the CDMS to grant access rights to a different principal (P). The client service generates a second encrypted version of the CEDK (E2-CEDK) for that P to use with a secret (S). The E2-CEDK is supplied over a secure communication session to the CDMS and the S is supplied to the P via an out-of-band communication channel. The P can then log into or receive an invitation to log into the CDMS and can supply the S to acquire the CEDK. The P may also be required to change the S in accordance with policy. The P includes its own processing instance of the client service to achieve the processing discussed herein with respect to the FIG. 2.

At 291, the client service pursuant instructions from the owning principal of the EC may also revoke access rights to the sharing P (access rights discussed at 290 above). Here, the client service instructs the CDMS to revoke access of P to the EC. The client service via interactions with the owning principal then generates a new encrypted version of the CEDK2 (E3-CEDK2) using the K (known to just the owning principal). The EC is decrypted with the original CEDK and then re-encrypted with CEDK2 to produce EC2. The E3-CEDK2 and the EC2 are then supplied to the CDMS to replace the original E-CEDK and the original E2.

Figure 3:
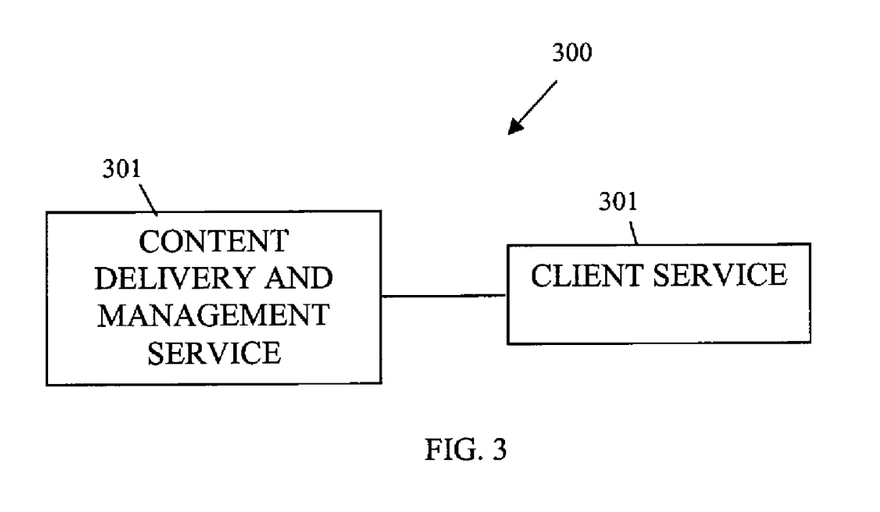
FIG. 3 is a diagram of a secure content delivery and management system, according to an example embodiment.

FIG. 3 is a diagram of a secure content delivery and management system 300, according to an example embodiment. The secure content delivery and management system 300 is implemented as instructions on or within a machine-accessible and readable medium. The instructions when executed by one or more machines perform the processing depicted in the methods 100 and 200 of the FIGS. 1 and 2, respectively. The secure content delivery and management system 300 is operational over a network that may be wired, wireless, or a combination of wired and wireless.

The secure content delivery and management system 300 includes a content delivery and management service 301 and a client service 302. Each of these and there interactions with one another will now be discussed in turn.

In an embodiment, the content delivery and management service (CDMS) 301 and the client service 302 are remote from one another over a network, such as a WAN and communicate via both insecure and secure communication sessions and channels.

The CDMS 301 is implemented in a machine-accessible and readable medium and is to process on a server machine (processing device). Example processing and features of a CDMS 301 was provided in detail above with reference to the content service represented by the method 100 of the FIG. 1.

The CDMS 301 is used to house, delivery, and manage encrypted content (EC) and encrypted keys produced and supplied by principals interacting via multiple instances of the client service 302. The CDMS 301 enforces access rights of the principals that are driven by policy. The CDMS 301 may also lock access to the EC and the encrypted keys when access rights of some principals are being changed or when re-keying activities are occurring. The CDMS 301 may also be used to hold escrowed encrypted keys (as discussed in detail above).

The client service 302 is implemented in a machine-accessible and readable medium and is to process on a client machine (processing device). Some example processing and some features of the client service 302 were provided in detail above with reference to the client service represented by the method 200 of the FIG. 2.

The client service 302 may service a single principal or may service multiple selective groupings of principals. Additionally, the network may include multiple processing instances of the client service 302. The client service 302 interacts with the CDMS 301 on behalf of a principal. Some operations that the client service 302 provides are key generation and encryption and decryption services.

The client service 302 supplies the EC that is encrypted with a content encryption/decryption key (CEDK) to the CDMS 301 for storage, management, and subsequent retrieval. An encrypted version of the CEDK (E-CEDK) is also supplied by the client service 302 to the CDMS 301. The CEDK is encrypted with a first key (K) known to just the owning principal (P). Moreover, the client service 302 supplies an encrypted version of the K (E-K) to the CDMS 301. Encrypted Key delivery and communication between the client service 302 and the CDMS 302 occurs via a secure communication session. The client service 302 may store and retrieve the encrypted keys and the encrypted content from the CDMS 302. Retrieval and delivery of the EC can occur via insecure communication sessions.

In an embodiment, the client service 302 may also supply additional encrypted versions of the CEDK to the CDMS 301 via one or more secure communication session and supply access rights for the other P's to acquire the additional encrypted versions of the CEDK. This scenario was described in detail above with respect to the methods 100 and 200 of the FIGS. 1 and 2. The client service 302 may also on behalf of a an owning P dynamically and selectively revoke access rights of the other P's via one or more of the secure communication sessions. In response to such a request, the CDMS 301 locks access to the EC and the client service 302 re-encrypts the encrypted content (E2-C) with a new CEDK (CEDK2) and encrypts the CEDK2 with the K to produce E-CEDK2 and supplies the E2-C and the E-CEDK2 to the CDMS 301 at which point the CDMS 301 unlocks access.

The client service 302 and the CDMS 301 may also interact with one another to re-key the EC, E-CEDK, and E-K. When this occurs, access is also locked by the CDMS 301 until the complete re-keying is achieved.

The client service 302 may also produce multiple different encrypted versions of the CEDK and encrypt each with a public key of an escrow agent or recovery service. The recovery service cannot access the CDMS 301. The client service 302 stores these multiple encrypted versions with the CDMS 301 and retrieves them in the event that the owning P is unable to subsequently decrypt the E-K. The encrypted versions are then supplied to the recovery services for decryption and the client service 302 assembles a valid CEDK for use with the EC or for use in encrypting additional content stored in encrypted format with the CDMS 301.

Figure 4:
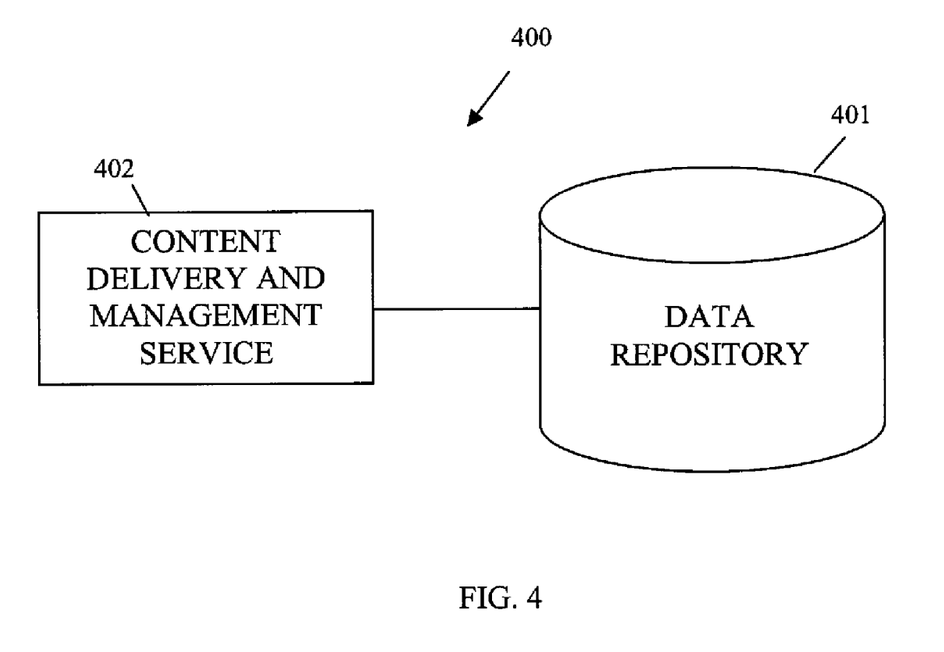
FIG. 4 is a diagram of another secure content delivery and management system, according to an example embodiment.

FIG. 4 is a diagram of another secure content delivery and management system 400, according to an example embodiment. The secure content delivery and management system 400 is implemented as instructions on or within a machine-accessible and readable medium. The instructions when executed by one or more machines perform enhanced processing depicted with respect to the method 100 and of the FIG. 1. The secure content delivery and management system 400 is also operational over a network, and the network may be wired, wireless, or a combination of wired and wireless.

The secure content delivery and management system 400 presents an alternative view and perspective to the secure content delivery and management system 300 of the FIG. 3 and from the primary perspective of the server or content delivery and management service 402 environment.

The secure content delivery and management system 400 includes a data repository 401 and a content delivery and management service 402. Each of these and their interactions with one another will now be discussed in turn.

The data repository 401 is implemented in a machine-accessible and readable medium and is to process on a server machine or be securely accessible to the machine that processes the content delivery and management service 402.

The data repository 401 houses a variety of information that is searched, retrieved, stored, and delivered by the CDMS 402. The information includes encrypted content (EC), where that content was encrypted by a principal using a content encryption/decryption key (CEDK). The CEDK is not stored in the data repository 401. The data repository 401 does however include one or more encrypted versions of the CEDK. At least one encrypted version of the CEDK (E-CEDK) is encrypted with a first key (K) supplied by an owning principal (P). The data repository 401 does not include the first key or any key in an unencrypted format. At least one additional encrypted key is an encrypted version of the K (E-K). The data repository 401 may also include access rights and policies consumed by the CDMS 402 in management and delivery of the EC and encrypted keys. Again, there are no unencrypted versions of the content or the keys, which appear in the data repository 401.

The content delivery and management service (CDMS) 402 is implemented in a machine-accessible and readable medium as instructions and is to process on a server machine. Example processing associated with the CDMS 402 was presented above with respect to the content service represented by the method 100 of the FIG. 1 and with respect to the CDMS 301 represented within the secure content delivery and management system 300 of the FIG. 3.

The CDMS 402 is also unaware of the content or any of the keys in unencrypted formats. That is, the CDMS 402 is never in possession of unencrypted content or unencrypted keys.

The CDMS 402 receives the EC, E-CEDK, and E-K from a principal (P) or a client service acting on behalf of P within a client environment of the P. The CDMS 402 also receives access rights and policy to manage the EC and the encrypted keys from the client service. This information is stored, retrieved, and delivered in accordance with instructions from the P (via the client service) and in accordance with policy. The CDMS 402 uses the data repository 401 to store and manage this information.

In an particular situation, the CDMS 402 may receive access privileges from the client service that is acting on behalf of a first principal for purposes of permitting other principals to access the EC and other encrypted versions of the CEDK tailored to those other principals. The first principal may do this to share the EC (as was discussed in detail above with respect to the FIGS. 1-3).

According to an embodiment, the CDMS 402 interacts with the client service to re-key the EC, the E-CEDK, and the E-K. When this occurs, access to the EC and encrypted keys is locked until the re-keying is completed. The client service and the CDMS 402 may also interact to selectively revoke access of some sharing principals of the EC. This too requires a temporary lock on access and a re-keying of at least the CEDK and the E-CEDK.

When the E-CEDK or the E-K or even other encrypted versions of the CEDK are communicated between the CDMS 402 and a client service, this communication occurs via a secure communication session, such as SSL. However, retrieval and communication of the EC may occur via insecure communication sessions, such as HTTP, etc.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method residing and implemented in a non-transitory machine-accessible medium and for executing on a processing device, comprising:
   receiving, by the processing device, an encrypted version of a content encryption/decryption key from a principal, wherein the content encryption/decryption key has been encrypted by the principal using a first key known to just the principal;
   receiving, by the processing device, an encrypted version of the first key;
   storing, by the processing device, the encrypted versions of the content encryption/decryption key and the first key in an environment that is remote from the principal over a network connection;
   housing, by the processing device, encrypted content that has already been encrypted by the principal with the content encryption/decryption key, wherein the principal supplies the encrypted content;
   delivering, by the processing device, the encrypted content via insecure communications and the encrypted versions of the content encryption/decryption key in response to policy via secure communications;
   receiving, by the processing device, a second encrypted version of the content encryption/decryption key from the principal, wherein the second encrypted version of the content encryption/decryption key and the encrypted content are identified as being accessible via policy to a second principal;
   storing, by the processing device, the second encrypted version of the content encryption/decryption key in the environment;
   delivering, by the processing device, the second encrypted version of the content encryption/decryption key to the second principal when the second principal authenticates and during a secure communication session for the second principal to use in order to acquire the content encryption/decryption key and decrypt the encrypted content;
   receiving, by the processing device, an instruction from the principal to revoke access rights to the encrypted content associated with the second principal;
   locking, by the processing device, access to the encrypted content to prevent the second principal from acquiring the encrypted content;
   receiving, by the processing device, an encrypted version of a second content encryption/decryption key from the principal, wherein the second content encryption/decryption key is also encrypted with the first key known to the principal;
   housing, by the processing device, a re-encrypted and new version of the encrypted content that is now encrypted with the second content encryption/decryption key; and
   unlocking, by the processing device, access to the re-encrypted and new version of the encrypted content.

2. The method of claim 1 further comprising:
   receiving, by the processing device, a third encrypted version of the content encryption/decryption key from the principal, wherein the third encrypted version of the content encryption/decryption key is encrypted with a public key of a trusted-third party recovery service; and
   storing, by the processing device, the third encrypted version of the content encryption/decryption key on behalf of the principal to permit the principal via the trusted-third party recovery service to subsequently acquire the content encryption/decryption key when the principal becomes unable to decrypt the encrypted version of the first key.

3. The method of claim 1 further comprising:

receiving, by the processing device, a third encrypted version for a first portion of the content encryption/decryption key from the principal, wherein the third second encrypted version of the content encryption/decryption key is encrypted with a first public key of a first trusted-third party recovery service;

receiving, by the processing device, a fourth encrypted version for a second portion of the content encryption/decryption key from the principal, wherein the fourth encrypted version of the content encryption/decryption key is encrypted with a second public key of a second trusted-third party recovery service; and storing, by the processing device, the third encrypted version of the content encryption/decryption key and the fourth encrypted version of the content encryption/decryption key on behalf of the principal to permit the principal via both the first and second trusted-third party recovery services to subsequently acquire the content encryption/decryption key when the principal becomes unable to decrypt the encrypted version of the first key.

4. The method of claim 1 further comprising, authenticating, by the processing device, the principal and interacting with the principal in a secure communication session when acquiring the encrypted versions of the content encryption/decryption key and the first key from the principal.

5. The method of claim 1 further comprising:

receiving, by the processing device, a re-key request from the principal;

locking, by the processing device, access to the encrypted content;

receiving, by the processing device, an encrypted version of a new content encryption/decryption key from the principal, wherein the new content encryption/decryption key is encrypted with a new second key known to the principal;

receiving, by the processing device, an encrypted version of the new second key;

storing, by the processing device, the encrypted versions of the new content encryption/decryption key and the new second key in the environment;

housing, by the processing device, a re-encrypted and new version of the encrypted content that has already been re-encrypted with the new encryption/decryption key by the principal; and unlocking, by the processing device, access to the re-encrypted and new version of the encrypted content.

6. A method implemented and residing in a non-transitory machine-accessible medium and for executing on a processing device, comprising:

establishing, by the processing device, a secure communication session with a content delivery and management service;

supplying, by the processing device, an encrypted version of a content encryption/decryption key that is encrypted with a first key and delivered to the content delivery and management service;

supplying, by the processing device, an encrypted version of the first key to the content delivery and management service;

supplying, by the processing device, content encrypted with the content encryption/decryption key to the content delivery and management service;

instructing, by the processing device, the content delivery and management service to grant access rights to the encrypted content to a principal;

generating, by the processing device, a second encrypted version of the content encryption/decryption key with a secret;

supplying, by the processing device, the second encrypted version of the content encryption/decryption key to the content delivery and management service for subsequent secure delivery to the principal;

supplying, by the processing device, the secret using an out-of-band communication channel to the principal;

instructing, by the processing device, the content delivery and management service to revoke the access rights of the principal;

generated, by the processing device, a new content encryption/decryption key and encrypting it with the first key;

re-encrypting, by the processing device, the encrypted content with the new content encryption/decryption key; and supplying, by the processing device, the re-encrypted content and an encrypted version of the new content encryption/decryption key to the content delivery and management service.

7. The method of claim 6 further comprising, supplying, by the processing device, an alternative encrypted version of the content encryption/decryption key to the content delivery and management service, wherein the alternative encrypted version of the content encryption/decryption key is encrypted with a public key of a trusted third-party recovery service.

8. The method of claim 6 further comprising, supplying, by the processing device, first and second alternative encrypted versions of the content encryption/decryption key to the content delivery and management service, wherein the first and second alternative encrypted versions each represent different portions of the content encryption/decryption key and each is encrypted with a different public key for a different trusted third-party recovery service.

9. The method of claim 6 further comprising, requesting, by the processing device, the content encryption/decryption key from one or more trusted third-party recovery services used decrypt the encrypted content and to encrypt additional content that is subsequently supplied to the content delivery and management service in encrypted format.

10. The method of claim 6 further comprising:

requesting, by the processing device, the encrypted versions of the content encryption/decryption key and the first key from the content delivery and management service during a different secure communication session with the content delivery and management service; and requesting, by the processing device, the encrypted content from the content delivery and management service during an insecure communication session with the content delivery and management service.

* * * * *

UNITED STATES PATENT AND TRADEMARK OFFICE
CERTIFICATE OF CORRECTION

| | | |
|---|---|---|
| PATENT NO. | : 7,864,960 B2 | Page 1 of 1 |
| APPLICATION NO. | : 11/755837 | |
| DATED | : January 4, 2011 | |
| INVENTOR(S) | : A. Green et al. | |

It is certified that error appears in the above-identified patent and that said Letters Patent is hereby corrected as shown below:

In column 15, line 7, in Claim 3, after "third" delete "second".

In column 16, line 48, in Claim 9, after "used" insert -- to --.

Signed and Sealed this
Eighth Day of March, 2011

David J. Kappos
*Director of the United States Patent and Trademark Office*